United States Patent [19]

Tetsugu et al.

[11] 4,189,666
[45] Feb. 19, 1980

[54] SPEED CONTROL SYSTEM FOR SMALL SIZE D-C ELECTRIC MOTOR

[75] Inventors: Yoshio Tetsugu; Hiromitsu Nakano, both of Katano; Hiroshi Minakuchi, Shiga; Tomio Oyama, Toyonaka; Isao Yoshida, Neyagawa; Mitsuharu Ota; Kazutsugu Kobayashi, both of Takatsuki, all of Japan

[73] Assignee: Matsushita Electric Industrial Co., Ltd., Osaka, Japan

[21] Appl. No.: 904,984

[22] Filed: May 11, 1978

[30] Foreign Application Priority Data

May 19, 1977 [JP] Japan ................................. 52/58289

[51] Int. Cl.² ............................................. H02P 5/00
[52] U.S. Cl. .................................. 318/334; 318/331; 318/471
[58] Field of Search ................ 318/331, 345 CA, 471, 318/472, 473, 334, 399; 361/25

[56] References Cited

U.S. PATENT DOCUMENTS

3,705,337  12/1972  Grabl ................................... 318/331

Primary Examiner—David Smith, Jr.
Attorney, Agent, or Firm—Joseph W. Farley

[57] ABSTRACT

A speed control system for a d-c electric motor comprising a three-terminal space control IC to provide a constant voltage source having a negative internal resistance equal in absolute value to the internal resistance of the motor and thereby render the motor rotatable at a constant controlled speed. A resistance element having a positive temperature coefficient is used as an external circuit element for the IC so that rotation speed variations relative to load torque variations will be substantially constant despite variations in the ambient temperature.

1 Claim, 3 Drawing Figures

SPEED CONTROL SYSTEM FOR SMALL SIZE D-C ELECTRIC MOTOR

This invention relates to a system including a three-terminal speed control IC for controlling the speed of d-c electric motors.

A d-c electric motor having a given field system can be interpreted as being equivalent to a circuit comprising an internal resistance and the back electromotive force (back emf) to be induced by the rotation of the motor and connected in series with the resistance. If the d-c motor is driven by a constant voltage source with a negative internal resistance equal in absolute value to the internal resistance of the motor, the motor will be driven at a speed at which the back emf thereof is equivalent to the voltage source at all times. Thus the motor is rotatable at a constant speed independent of load variations and other factors.

Although this principle is already known, voltage sources with such an internal resistance were complex and expensive in circuit construction and therefore found only limited use.

With the remarkable progress of IC techniques in recent years, however, voltage sources of the type described have been introduced into use in the form of an IC for controlling the speed of d-c electirc motors.

Conventionally many of such speed controlling ICs comprise an inexpensive three-terminal unit useful for transistors and, in combination with a few external circuit elements, the circuit constitutes a system for controlling the speed of d-c electric motors.

A d-c motor speed controlling system incorporating a three-terminal speed control IC will be described below with reference to FIG. 1. Indicated at 1 is a d-c electric motor the speed of which is to be controlled and at 2 is a speed control IC having terminals A, B and C. The IC 2 is provided with resistors 3 and 4 serving as external circuit elements. The resistor 3 is connected between the terminal A and the positive terminal of a power source 5. the resistor 4 is connected between the terminals A and B. The d-c motor 1 is connected between the terminal B and the positive terminal of the power source 5. The terminal C is grounded. Arrows $I_a$, $I_s$, $I_T$, $I_2$, $I_K$ and $I_r$ designate the currents flowing through the indicated positions. Indicated at $R_a$ is the equivalent internal resistance of the d-c motor 1, at $E_a$ the back emf thereof, at $V_{ref}$ the reference voltage across the terminals A and B of the IC 2, and at $V_c$ the voltage of the power source 5.

By the current dividing circuit involved, the IC 2 is so designed that the current $I_K$ is always $1/K$ of $I_2$ where K is a current dividing ratio. Assuming that the resistors 3 and 4 have resistance values of $R_T$ and $R_s$, the voltage $V_o$ across the motor 1 is given by $$V_o = V_{ref}\left\{1 + \frac{R_T}{R_s}(1 + \frac{1}{K})\right\} + R_T I_r + \frac{R_T}{K} I_a \quad (1)$$

$$\equiv V + \frac{R_T}{K} I_a \quad (2)$$

When the resistance values $R_s$ and $R_T$ are given, the first and second terms on the right side of Equation (1) are constant despite variations in the power source voltage $V_c$, load torque (i.e. armature current $I_a$), etc., while the third term on the right side varies in proportion to the armature current $I_a$. If the first term on the right of Equation (2) is regarded as a voltage source, the circuit is equivalent to the voltage source connected in series with a resistance of $-R_T/K$.

On the other hand, assuming that the terminal voltage of the d-c motor 1 is $V_m$, $$V_m = E_a + R_a I_a \quad (3)$$

In FIG. 1, $$V_o = V_m \quad (4)$$

This gives the relation of $$V + (R_T/K)I_a = E_a + R_a I_a \quad (5)$$

Accordingly the back emf of the motor 1 is expressed by $$E_a = V + (R_T/K - R_a)I_a \quad (6)$$

Thus, if the resistance $R_T$ is so adjusted that $$R_T = KR_a \quad (7)$$

the result is that $$E_a = V$$

The motor will then be driven at a speed at which the back emf $E_a$ thereof is equal to the definite voltage V at all times. The motor 1 is therefore reotatable at a constant speed without being affected by load variations, etc.

In other words, if the motor 1 rotates at a speed of N and has a power generation constant of $K_a$, $$E_a = K_a N \quad (8)$$

Therefore, $$N = \frac{1}{K_a}\left[V_{ref}\left\{1 + \frac{R_T}{R_s}(1 + \frac{1}{K})\right\} + I_a\left(\frac{R_T}{K} - R_a\right) + R_T I_r\right] \quad (9)$$

If the resistance value $R_T$ is made equal to $KR_a$ in corresponding relation to the internal resistance $R_a$ of the d-c motor 1, namely if $$R_T = KR_a \quad (10)$$

the result is that $$N = \frac{1}{K_a}\left[V_{ref}\left\{1 + \frac{R_T}{R_s}(1 + \frac{1}{K})\right\} + R_T I_r\right] \quad (11)$$

Thus a constant rotation speed is obtained free of the influence of the armature current $I_a$ of the motor 1, namely of the load torque. The speed of rotation can be adjustably set by altering the value $R_s$ of the resistor 4.

Further assuming that the torque of the motor 1 is $T_M$ and the torque constant of the same is $K_t$, $$T_M = K_t I_a \quad (12)$$

The speed of rotation is given by $$N = \frac{1}{K_a} [V_{ref}\left(1 + \frac{R_T}{R_s}(1 + \frac{1}{K})\right) + \frac{T_M}{K_t}(\frac{R_T}{K} - R_a) + R_T I_r] \quad (13)$$

The d-c motor speed controlling system shown in FIG. 1 operates on the principle described above.

With speed control systems such as one described above, carbon-film fixed resistors which involve reduced variations in resistance at varying temperatures are usually used as the resistors 3 and 4 serving as external circuit elements for the IC 2.

Now with the reference to the speed control system including the d-c motor 1, variations in the speed of rotation relative to variations in the load torque will be discussed when the system is subjected to variations in the ambient temperature. It is assumed that the speed variation per unit load torque is $\mu$.

FIG. 2 shows the loading characteristics of the conventional system. It is seen that the rotational speed variation relative to the torque variation is smaller at lower temperature and greater at higher temperatures than at ordinary temperature. If this tendency becomes pronounced, positive feedback takes place at lower temperatures, impairing the stability of the control circuit and producing adverse effects such as oscillations or uneven rotation. At higher temperatures, the rotational speed varies greatly relative to torque variations.

These detrimental effects are attributable to the fact that the armature winding of the d-c motor 1 is usually a copper conductor winding which is 0.4%/°C. in the temperature coefficient of resistance, whereas the resistor 3 is a carbon-film fixed resistor having a low temperature coefficient of about −0.05%/°C.

An object of this invention is to overcome the above problem by using as the resistor 3 a resistance element having a positive temperature coefficient such as a copper winding resistor equivalent to the armature winding or a metal-film resistor having a selectively determinable temperature coefficient to thereby offset the variation of the resistance of the armature winding due to a variation in temperature, so that rotation speed variations relative to load torque variations (loading characteristics) will be substantially constant despite variations in the ambient temperature.

Another object of this invention is to ensure accurate speed control with high stability with use of a reduced number of parts at a low cost.

This invention will be described below in greater detail with reference to the accompanying drawings, in which.

Figure 1:
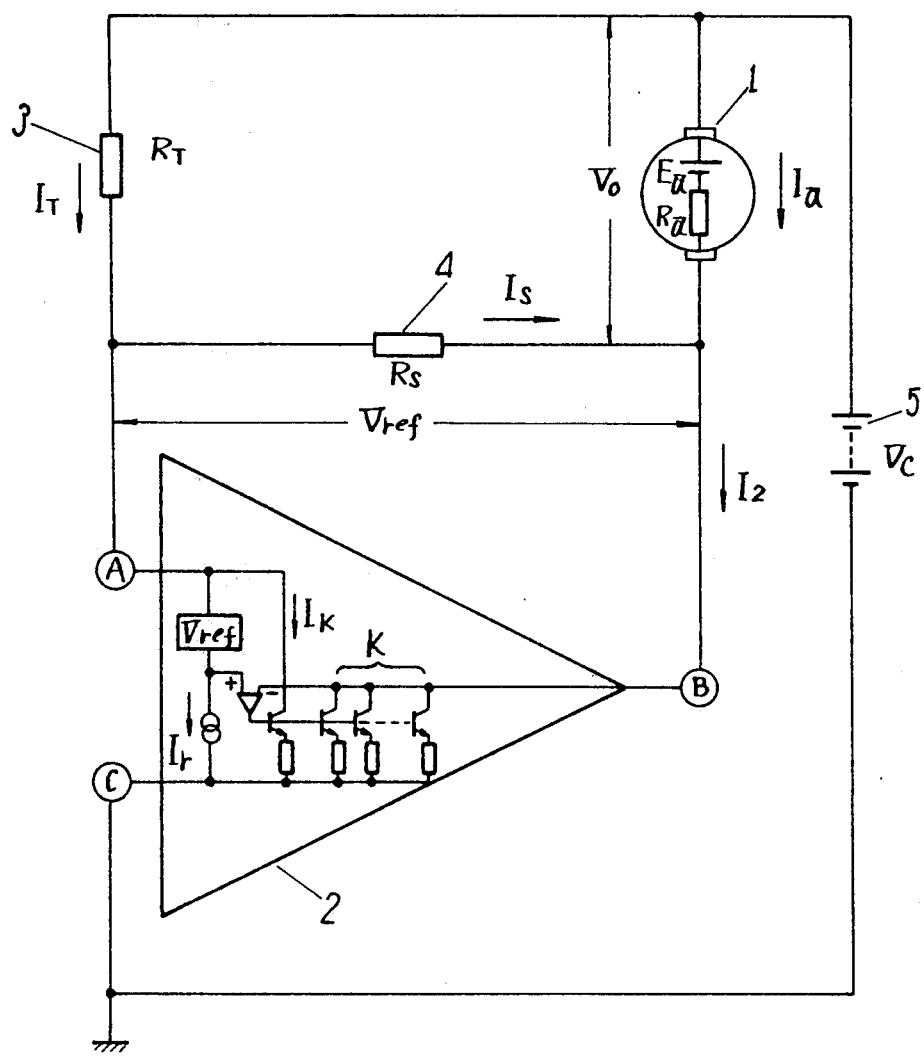
FIG. 1 is an electric circuit diagram illustrating a system incorporating a three-terminal speed control IC for controlling the speed of a d-c electric motor.
Figure 2:
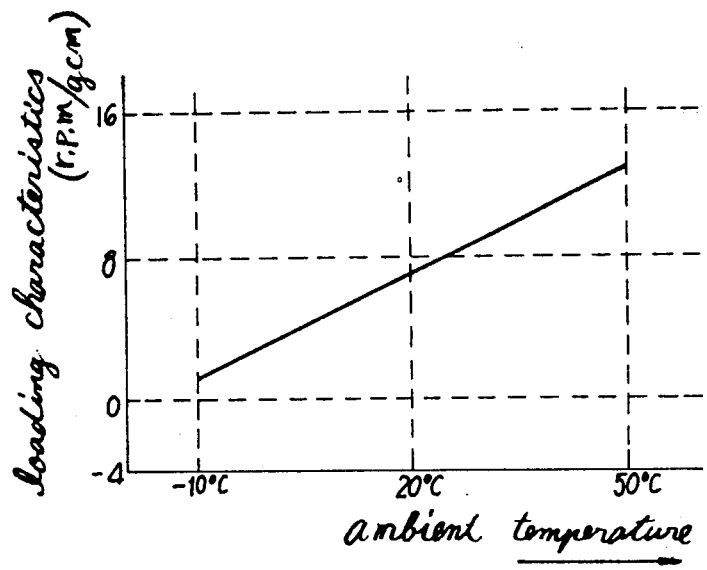
FIG. 2 is a diagram showing the loading characteristics conventionally available at varying temperatures with use of the system.
Figure 3:
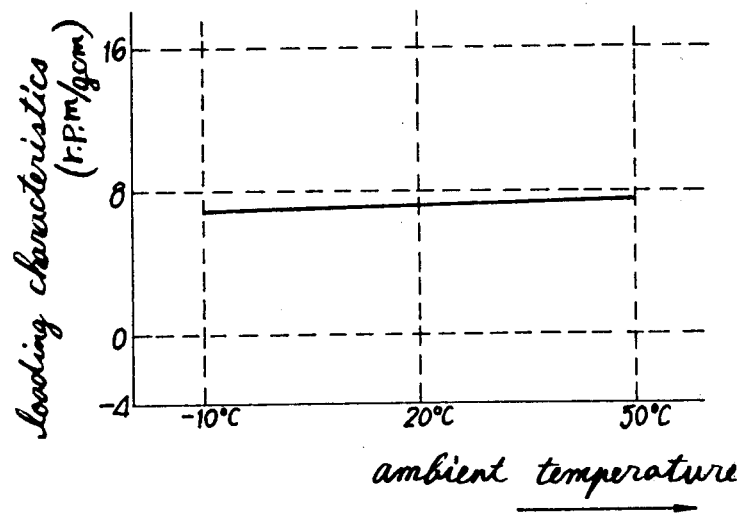
FIG. 3 is a diagram showing the loading characteristics afforded by this invention at varying temperatures with use of the system.

An embodiment of this invention with the characteristics shown in FIG. 3 includes a metal-film resistor having a temperature coefficient of 0.36%/°C. and serving as the aforementioned resistor 3. The loading characteristics $\mu$ involve hardly any variations despite temperature variations.

A detailed description will be given below with use of mathematical equations. The rotation speed variation relative to the load torque variation, namely loading characteristics $\mu$, can be expressed by Equation (14) derived from Equation (13) through partial differentiation with the torque $T_M$.

$$\mu = \frac{\partial N}{\partial T_M} = \frac{1}{K_a \cdot K_t}(\frac{R_T}{K} - R_a) \quad (14)$$

The variation in the loading characteristics $\mu$ relative to the temperature variation is expressed by $$\frac{\Delta \mu}{\Delta T} = (\frac{\Delta \mu}{\Delta T})K_a + (\frac{\Delta \mu}{\Delta T})K_t + (\frac{\Delta \mu}{\Delta T})R_a + (\frac{\Delta \mu}{\Delta T})R_T + (\frac{\Delta \mu}{\Delta T})K \quad (15)$$
$$= -\frac{1}{K_a^2 \cdot K_t}(\frac{R_T}{K} - R_a)\frac{\Delta K_a}{\Delta T} - \frac{1}{K_a \cdot K_t^2}(\frac{R_T}{K} - R_a)\frac{\Delta K_t}{\Delta T}$$
$$- \frac{1}{K_a \cdot K_t}\frac{\Delta R_a}{\Delta T} + \frac{1}{K_a \cdot K_t \cdot K}\frac{\Delta R_T}{\Delta T} - \frac{R_T}{K_a \cdot K_t \cdot K^2}\frac{\Delta K}{\Delta T}$$

wherein T is absolute temperature.
If $$R_T = K R_a, \quad (16)$$

$$\frac{\Delta \mu}{\Delta T} = -\frac{R_a}{K_a \cdot K_t}(\frac{1}{R_a}\frac{\Delta R_a}{\Delta T} - \frac{1}{R_T}\frac{\Delta R_T}{\Delta T} + \frac{1}{K}\frac{\Delta K}{\Delta T}) \quad (17)$$

Equation (17) indicates that the following relation must be established to reduce the temperature dependence of the loading characteristics $\mu$ to zero.

$$\frac{1}{R_a}\frac{\Delta R_a}{\Delta T} - \frac{1}{R_T}\frac{\Delta R_T}{\Delta T} + \frac{1}{K}\frac{\Delta K}{\Delta T} = 0 \quad (18)$$

The temperature characteristic of the current dividing ration K in the IC 2 is as low as about 0.004%/°C. in view of the principle of the operation of the curcuit and is therefore almost negligible.

Thus variations in the loading characteristics $\mu$ with temperature can be almost eliminated by rendering the temperature coefficient of the resistance value $R_T$ of the resistor 3 equal to the temperature coefficient of the internal resistance, namely of the armature winding resistance $R_a$.

What is claimed is:

1. A speed control system for a small size d-c electric motor comprising a three-terminal speed control IC having a first terminal and a second terminal for producing a reference voltage thereacross and a grounded third terminal, the first terminal being adapted to pass therethrough a current in proportion to the current through the second terminal, the d-c motor being connected between a power source positive terminal and the second terminal, and a first resistor and a second resistor serving as external circuit elements for the IC, the first resistor being connected between the power source positive terminal and the first terminal, the second resistor being connected between the first and second terminals, to provide a constant voltage source having a negative internal resistance equal in absolute value to the internal resistance of the d-c motor and thereby render the d-c motor rotatable at a constant controlled speed, the system being characterized in that the first resistor is a metal-film fixed resistor substantially equivalent to the armature resistance of the motor in temperature coefficient.

* * * * *